(12) United States Patent
Ishikawa

(10) Patent No.: US 12,188,559 B2
(45) Date of Patent: Jan. 7, 2025

(54) CHAIN TENSIONER

(71) Applicant: TSUBAKIMOTO CHAIN CO., Osaka (JP)

(72) Inventor: Yuichiro Ishikawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/383,346

(22) Filed: Oct. 24, 2023

(65) Prior Publication Data
US 2024/0167542 A1    May 23, 2024

(30) Foreign Application Priority Data

Nov. 18, 2022 (JP) ................................. 2022-184892

(51) Int. Cl.
*F16H 7/08* (2006.01)

(52) U.S. Cl.
CPC ....... *F16H 7/08* (2013.01); *F16H 2007/0806* (2013.01); *F16H 2007/0812* (2013.01); *F16H 2007/0859* (2013.01)

(58) Field of Classification Search
CPC ............... F16H 7/08; F16H 2007/0802; F16H 2007/0806; F16H 2007/0812; F16H 7/0848; F16H 2007/0859; F16H 2007/0814; F16H 7/0829; F16H 7/0834; F16H 7/0836; F16H 2007/0891; F16H 2007/0895; F16H 2007/0897
See application file for complete search history.

(56) References Cited

U.S. PATENT DOCUMENTS

| | | | | | |
|---|---|---|---|---|---|
| 4,527,462 | A | * | 7/1985 | Okabe | F16H 7/08 92/51 |
| 4,674,996 | A | * | 6/1987 | Anno | F16H 7/129 474/133 |
| 4,761,155 | A | * | 8/1988 | Kinoshita | F02B 67/06 474/133 |
| 4,963,121 | A | * | 10/1990 | Himura | F16H 7/08 474/111 |
| 5,073,150 | A | * | 12/1991 | Shimaya | F16H 7/0848 474/110 |

(Continued)

FOREIGN PATENT DOCUMENTS

JP         2013-7422 A        1/2013

*Primary Examiner* — Michael R Mansen
*Assistant Examiner* — Raveen J Dias
(74) *Attorney, Agent, or Firm* — WHDA, LLP

(57) ABSTRACT

A chain tensioner that can ensure oil with such a volume that sufficiently fills a pressure oil chamber in a tensioner body and can quickly fill the pressure oil chamber with the oil with a simple constitution and without increasing a size of the tensioner body is provided.
In a chain tensioner including a tensioner body having a plunger holding hole, a plunger, and urging means that is telescopically accommodated in a pressure oil chamber and urges the plunger, the plunger holding hole has a plunger holding wall sliding with the plunger and a plunger holding bottom-surface part, an oil storing chamber is provided on an outer periphery side of the plunger holding wall, and on an end part on the plunger holding bottom-surface part side of the plunger holding hole, a check valve unit that connects the pressure oil chamber and the oil storing chamber are provided.

7 Claims, 3 Drawing Sheets

(56) References Cited

U.S. PATENT DOCUMENTS

| | | | | |
|---|---|---|---|---|
| 5,482,262 A * | 1/1996 | Hayakawa | F16H 7/1236 | 474/138 |
| 5,569,105 A * | 10/1996 | Sakai | F02B 67/06 | 474/133 |
| 5,607,368 A * | 3/1997 | Hida | F16H 7/0848 | 474/135 |
| 5,630,768 A * | 5/1997 | Nakakubo | F16H 7/1263 | 474/135 |
| 5,632,698 A * | 5/1997 | Suzuki | F16H 7/0848 | 474/135 |
| 5,637,047 A * | 6/1997 | Schulze | F16H 7/0848 | 474/136 |
| 5,785,619 A * | 7/1998 | Nakakubo | F16H 7/08 | 474/138 |
| 5,833,220 A * | 11/1998 | Nakakubo | F16H 7/0848 | 188/266.2 |
| 5,860,881 A * | 1/1999 | Tada | F16H 7/08 | 474/111 |
| 5,913,742 A * | 6/1999 | Nakamura | F16H 7/0848 | 474/110 |
| 5,967,920 A * | 10/1999 | Dembosky | F16H 7/0848 | 474/140 |
| 6,106,424 A * | 8/2000 | Kratz | F16H 7/0836 | 474/138 |
| 6,146,300 A * | 11/2000 | Suzuki | F16H 7/08 | 474/111 |
| 6,193,623 B1 * | 2/2001 | Koch | F16H 7/0836 | 474/138 |
| 6,471,612 B2 * | 10/2002 | Nakakubo | F16H 7/0836 | 474/110 |
| 6,602,154 B1 * | 8/2003 | Guichard | F16H 7/0848 | 474/101 |
| 2001/0003279 A1 * | 6/2001 | Brandl | F01L 1/022 | 123/90.31 |
| 2001/0007840 A1 * | 7/2001 | Nakakubo | F16H 7/0836 | 474/138 |
| 2002/0098932 A1 * | 7/2002 | Hashimoto | F16H 7/0848 | 474/110 |
| 2003/0171179 A1 * | 9/2003 | Okuda | F16H 7/129 | 474/135 |
| 2004/0092349 A1 * | 5/2004 | Iwamoto | G01B 7/02 | 137/554 |
| 2007/0032323 A1 * | 2/2007 | Yoshida | F16H 7/0848 | 474/110 |
| 2007/0270259 A1 * | 11/2007 | Koch | F16H 7/0848 | 474/110 |
| 2007/0287562 A1 * | 12/2007 | Assel | F16H 7/0848 | 474/110 |
| 2008/0248906 A1 * | 10/2008 | Ullein | F16H 7/0848 | 474/110 |
| 2008/0318717 A1 * | 12/2008 | Kurematsu | F16H 7/0848 | 474/110 |
| 2009/0111628 A1 * | 4/2009 | Poiret | F16H 7/0848 | 474/110 |
| 2010/0087284 A1 * | 4/2010 | Norimatsu | F16H 7/0848 | 474/110 |
| 2010/0222167 A1 * | 9/2010 | Chekansky | F16H 7/0848 | 474/110 |
| 2011/0111898 A1 * | 5/2011 | Mishima | F16H 7/0848 | 474/101 |
| 2012/0322596 A1 * | 12/2012 | Hofmann | F16H 7/0848 | 474/110 |
| 2013/0303318 A1 * | 11/2013 | Hofmann | F16H 7/08 | 474/110 |
| 2014/0200104 A1 * | 7/2014 | Kurematsu | F16H 7/08 | 474/110 |
| 2015/0024887 A1 * | 1/2015 | Oh | F16H 7/0848 | 474/110 |
| 2015/0226345 A1 * | 8/2015 | Hartmann | F16K 15/044 | 137/539 |
| 2016/0186838 A1 * | 6/2016 | Kurematsu | F16H 7/08 | 474/110 |
| 2016/0348765 A1 * | 12/2016 | Ishikawa | F16H 7/08 | |
| 2017/0356529 A1 * | 12/2017 | Simmons | F16H 7/0848 | |
| 2017/0363181 A1 * | 12/2017 | Freemantle | F16H 7/0848 | |
| 2017/0370447 A1 * | 12/2017 | Freemantle | F16H 7/0848 | |
| 2018/0017142 A1 * | 1/2018 | Mochizuki | F16H 7/0836 | |
| 2018/0259044 A1 * | 9/2018 | Ness | F16H 7/0848 | |
| 2018/0363739 A1 * | 12/2018 | Hartmann | F16H 7/08 | |
| 2019/0024762 A1 * | 1/2019 | Todd | F16H 7/0848 | |
| 2019/0257389 A1 * | 8/2019 | Sato | F16H 7/08 | |
| 2020/0011401 A1 * | 1/2020 | Kurematsu | F16H 7/0848 | |
| 2020/0018383 A1 * | 1/2020 | Lu | F16H 7/0848 | |
| 2020/0182270 A1 * | 6/2020 | Ludwick | F16H 7/08 | |
| 2020/0200239 A1 * | 6/2020 | Cobb | F16H 7/08 | |
| 2020/0284325 A1 * | 9/2020 | Hunt | F16H 7/08 | |
| 2021/0010570 A1 * | 1/2021 | Kurematsu | F16H 7/0848 | |

* cited by examiner

CHAIN TENSIONER

BACKGROUND OF THE INVENTION

1. Field of the Invention

The present invention relates to a chain tensioner including a tensioner body having a cylindrical plunger holding hole one side of which is open, a cylindrical plunger slidably inserted into the plunger holding hole, and urging means which urges the plunger telescopically accommodated in a pressure oil chamber formed by the plunger holding hole and the plunger to a protruding direction on a front side.

2. Description of the Related Art

Conventionally, a tensioner for properly holding a tension of a chain or the like is customarily used, and in a chain guide mechanism which guides sliding of a transmission chain such as a roller chain endlessly wound between sprockets provided on a crank shaft and a cam shaft, respectively, in an engine room by a tensioner lever, for example, in order to properly maintain the tension of the chain or the like, a chain tensioner (hydraulic tensioner 100) which urges the tensioner lever by the tensioner is publicly known by the Japanese Patent Application Publication No. 2013-7422 and the like.

The chain tensioner (the hydraulic tensioner 100), which is publicly known by the Japanese Patent Application Publication No. 2013-7422, includes a tensioner body (housing 110) having a cylindrical plunger holding hole (holding hole 112) one side of which is open, a cylindrical plunger (120) slidably inserted into the plunger holding hole (holding hole 112), and urging means (plunger urging spring 130) telescopically accommodated in a pressure oil chamber (hydraulic chamber 131) formed by the plunger holding hole (holding hole 112) and the plunger (120) and urging the plunger (120) in a protruding direction on a front side.

Moreover, the plunger holding hole (holding hole 112) has a plunger holding wall directly sliding with the inserted plunger (120) and a plunger holding bottom-surface part at a position opposed to an open side of the plunger holding hole (holding hole 112), and in an end part on the plunger holding bottom-surface part side of the plunger holding hole (holding hole 112), a valve oil passage 143 connecting to an oil supply hole (supply oil passage 111) is formed, and a check valve unit (check valve unit 140) which connects the pressure oil chamber (hydraulic chamber 131) and the valve oil passage 143 capable of opening/closing is provided.

The chain tensioner (hydraulic tensioner 100) urges the plunger (120) toward the open side of the plunger holding hole (holding hole 112) by the urging means (plunger urging spring 130) all the time, whereby a tension of a timing chain can be maintained properly, and the vibration can be suppressed by pressing a swing chain guide is pressed.

Moreover, when an engine is started, the oil is supplied from the oil supply hole (supply oil passage 111) to the valve oil passage 143, and the check valve unit (check valve unit 140) is opened by a pressure of the oil, whereby the oil flows into the pressure oil chamber (hydraulic chamber 131).

As a result, since the pressure oil chamber (hydraulic chamber 131) is filled with the oil, the oil flows through a slight gap between the plunger (120) and the plunger holding hole (holding hole 112) with reciprocating movement of the plunger (120), and a damping effect which damps the reciprocating movement of the plunger (120) can be obtained by flow-passage resistance thereof.

SUMMARY OF THE INVENTION

However, the chain tensioner which is publicly known by the Japanese Patent Application Publication No. 2013-7422 still had a room for improvement.

That is, since the chain tensioner which is publicly known by the Japanese Patent Application Publication No. 2013-7422 does not have a spot in the tensioner body for storing the oil to be supplied into the pressure oil chamber in advance, it takes time from a state in which the oil has not been supplied into the pressure oil chamber at engine start or the like until the pressure oil chamber is filled with the oil, the damping effect cannot be obtained quickly, the reciprocating movement of the plunger cannot be damped sufficiently, and there was a concern that a time period during which a noise is generated occurs.

Moreover, such a chain tensioner is publicly known that, by providing an oil storing chamber for storing the oil in the tensioner body in advance in the vicinity of the plunger holding bottom-surface part or in the plunger so that the oil can be supplied quickly to the pressure oil chamber at the engine start, but since a space for providing the oil storing chamber is small in the vicinity of the plunger holding bottom-surface part of the tensioner body or in the plunger, there is a concern that a capacity capable of storing the oil so as to sufficiently fill the empty pressure oil chamber cannot be ensured, that a machining cost for the tensioner body or the plunger for providing the oil storing chamber increases, or that a size of the tensioner body or the plunger increases in order to ensure the oil storing chamber with a sufficient capacity and they cannot be accommodated in a space in the engine.

The present invention was made in order to solve these problems and has an object to provide a chain tensioner which can ensure oil with such a volume in the tensioner body that sufficiently fills the pressure oil chamber and can quickly fill the pressure oil chamber with the oil with a simple constitution and without increasing the size of the tensioner body.

The chain tensioner of the present invention is a chain tensioner including a tensioner body having a cylindrical plunger holding hole one side of which is open, a cylindrical plunger slidably inserted into the plunger holding hole, and urging means which is telescopically accommodated in the pressure oil chamber formed by the plunger holding hole and the plunger and urges the plunger to a protruding direction on a front side, in which the plunger holding hole has a plunger holding wall directly sliding with the inserted plunger and a plunger holding bottom-surface part at a position opposed to an open side of the plunger holding hole, and a cylindrical oil storing chamber is provided on an outer periphery side of the plunger holding wall, and on an end part on the plunger holding bottom-surface part side of the plunger holding hole, a check valve unit which connects the pressure oil chamber and the oil storing chamber capable of being opened/closed is provided, whereby the problem is solved.

According to a chain tensioner of one aspect of the present application, since a cylindrical oil storing chamber is provided on an outer periphery side of a plunger holding wall, an oil storing chamber with a large capacity can be provided on a thick part around a plunger holding hole.

As a result, since the oil which can sufficiently fill the capacity of a pressure oil chamber can be stored in the oil storing chamber in advance, even in a state in which the oil is not supplied to the pressure oil chamber at engine start or the like, the oil in an amount which can fill the pressure oil chamber can be quickly and reliably filled from the oil storing chamber via a check valve unit, and a damping effect to plunger reciprocating movement can be quickly obtained.

Moreover, since there is no more such time during which the damping effect at the engine start cannot be sufficiently obtained, there is no more need to provide a ratchet which limits instantaneous large movement of the plunger and thus, the number of components can be reduced, and even if an urging member with a low load is used, vibration of the plunger which causes a noise to be generated at the engine start does not occur.

Further, since there is no need to provide the oil storing chamber on a plunger holding bottom-surface part side, a size of the tensioner body is not increased, the chain tensioner does not put a pressure on a space in the engine, and cost-up can be suppressed.

Further, since the check valve unit is provided on the end part on the plunger holding bottom-surface part side, the oil is supplied from the oil storing chamber to the pressure oil chamber in a direction from the plunger holding bottom-surface part to an open part of the plunger holding hole.

As a result, by fixing the chain tensioner to the engine so that the open part of the plunger holding hole is directed upward, air in the pressure oil chamber is prevented from backflowing to the oil storing chamber via the check valve and can be quickly discharged to outside of the plunger holding hole through a gap between the plunger and the plunger holding hole.

According to another aspect, since the plunger holding wall is constituted by a sleeve which is a separate body from the plunger body, when the oil storing chamber is formed having a cylindrical shape, for example, it is only necessary to cut a concentric cylindrical shape as the plunger holding hole, whereby the cost-up can be suppressed.

Further, only by changing an inner diameter of the sleeve, a tensioner body which can easily deal with plungers with various outer diameters or a specification change of a capacity of the oil storing chamber or the like can be formed.

According to another aspect, since the sleeve has an outer-peripheral blocking plug which blocks the open side of the plunger holding hole in the oil storing chamber, when the oil storing chamber is formed having a cylindrical shape, for example, it is only necessary to cut a hole which is concentric with the plunger holding hole and has the same inner diameter as that of the oil storing chamber from the open side of the plunger holding hole, whereby the cost-up can be further suppressed.

Further, since the outer-peripheral blocking plug is integrally molded on the sleeve, an increase in the number of components can be suppressed.

According to another aspect, since the sleeve is integrally formed with the plunger holding bottom-surface part, most of the plunger holding hole is constituted by the sleeve side, there are few spots requiring highly accurate alignment with the tensioner body, and the specification change in compliance with the plunger shape or particularly a length of the plunger can be made more easily.

According to another aspect, since an oil supply hole which causes an outside of the tensioner body and the oil storing chamber to communicate with each other is provided in the oil storing chamber, by starting oil supply to the tensioner body at the engine start, even if the oil in the oil storing chamber is supplied into the pressure oil chamber at the engine start, the oil in the oil storing chamber does not runout, but the oil which sufficiently fills the pressure oil chamber can be continuously ensured in the oil storing chamber.

According to another aspect, since the oil supply hole is formed in the end part on an opening part side of the plunger holding hole in the oil storing chamber, by directing the open side of the plunger holding hole upward and by fixing a position of the tensioner body, most of the oil in the oil storing chamber does not leak out from the oil supply hole during the engine stop, but the oil which sufficiently fills the pressure oil chamber can be reliably ensured in the oil storing chamber.

According to another aspect, since an oil communication path which causes the check valve unit and the oil storing chamber to communicate with each other is formed in the vicinity of the plunger holding bottom-surface part, even if the plunger is pushed into the most depth side of the plunger holding hole, the oil communication path is not blocked by the plunger, but the oil can be reliably supplied from the oil storing chamber to the pressure oil chamber via the check valve unit.

According to another aspect, since the oil communication path is formed in a groove state in the vicinity of the plunger holding bottom-surface part, the oil communication path can be easily formed from the open side of the plunger holding hole, whereby the cost-up can be suppressed.

DESCRIPTION OF THE PREFERRED EMBODIMENTS

Hereinafter, a chain tensioner 100 according to an Embodiment of the present invention will be explained on the basis of the drawings.

Figure 1:
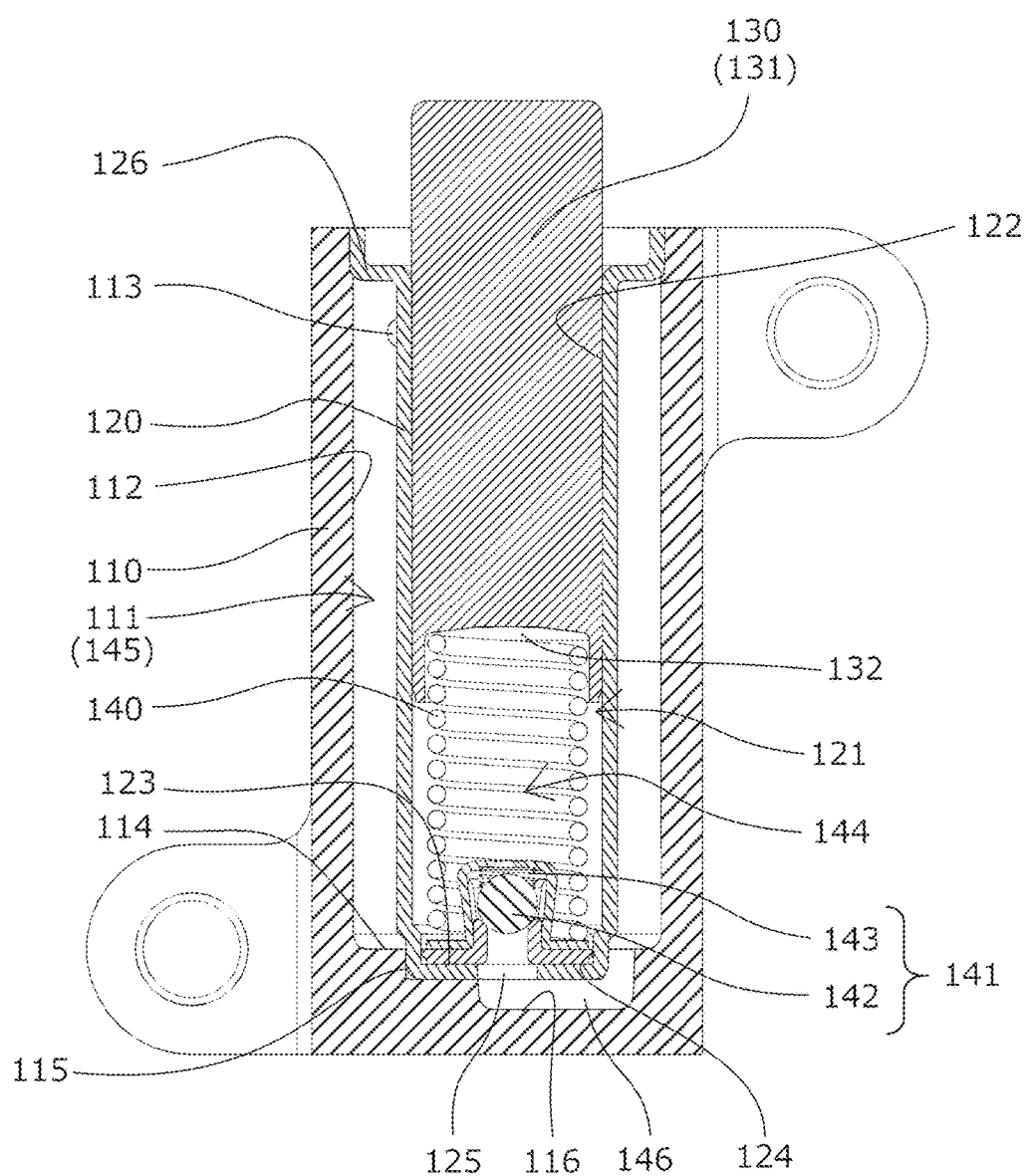
FIG. 1 is a sectional view of a chain tensioner 100 according to an Embodiment of the present invention.
Figure 2:
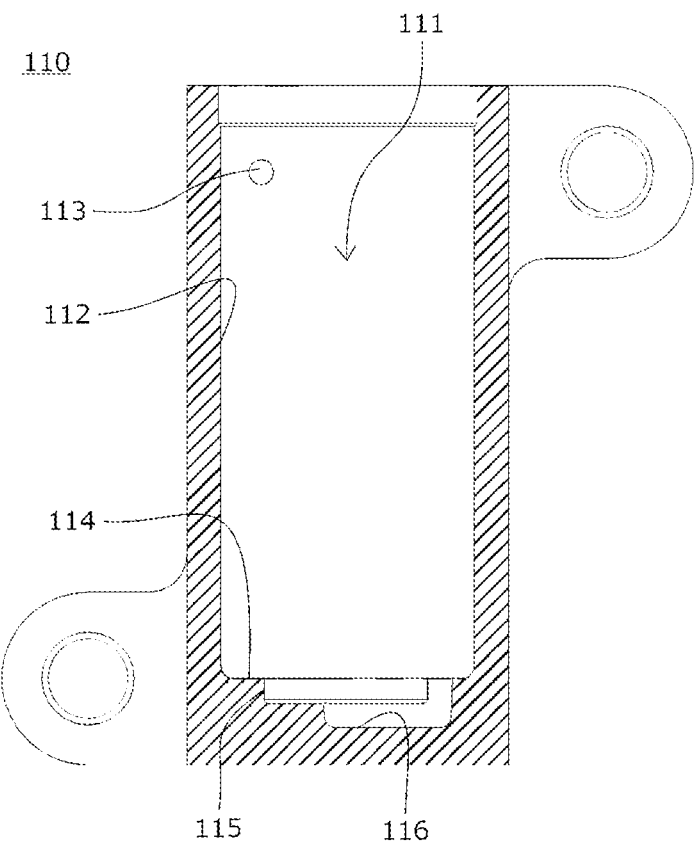
FIG. 2 is a sectional view of a tensioner body 110 of the chain tensioner 100 according to the Embodiment of the present invention.
Figure 3:
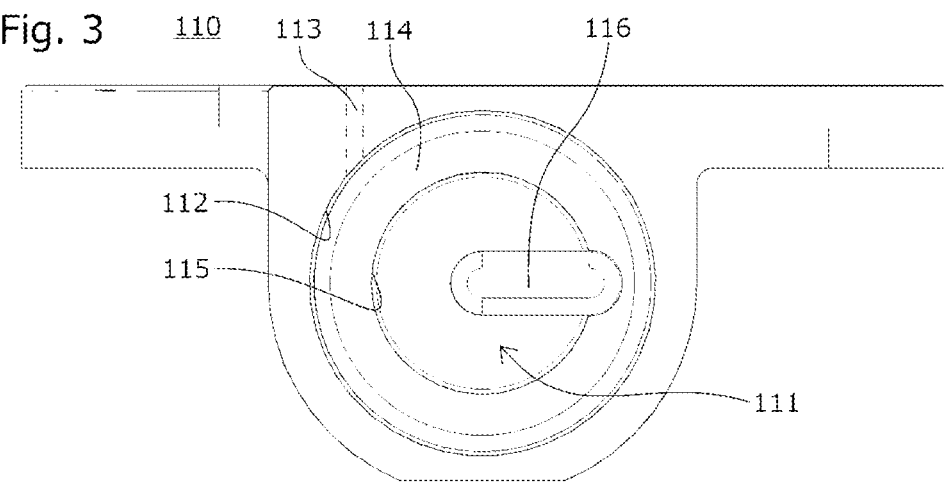
FIG. 3 is a top view of the tensioner body 110 of the chain tensioner 100 according to the Embodiment of the present invention.

A chain tensioner 100 according to the Embodiment of the present invention includes, as shown in FIGS. 1 to 3, a tensioner body 110 having a cylindrical body hole 111 one side of which is open, a sleeve 120 which forms a plunger holding hole 121 in the body hole 111, a cylindrical plunger 130 slidably inserted into a plunger holding hole 121, an urging member 140, which is urging means telescopically accommodated in a pressure oil chamber 144 formed by the plunger holding hole 121 and a plunger 130 and urging the plunger 130 to a protruding direction on a front side, and a check valve unit 141 which prevents a backflow of oil from the pressure oil chamber 144 to an oil storing chamber 145, which will be described later.

In the tensioner body 110, the body hole 111 in which an inner diameter of an opening part is the largest is formed by an oil storing wall 112 and an oil storing bottom-surface part 114, and an oil supply hole 113 which causes the oil storing wall 112 and an outside of the tensioner body 110 to communicate with other is provided in the vicinity of the body hole 111 open side of the oil storing wall 112.

In the oil storing bottom-surface part 114, a positioning portion 115 which is formed deeper than the oil storing bottom-surface part 114 and a communication groove 116 which is formed deeper than the positioning portion 115 and having one end extended to a position outward in a radial direction of the positioning portion 115 and inward in the radial direction of the oil storing wall 112 are formed.

In the sleeve 120, the plunger holding hole 121 is formed by the plunger holding wall 122 and the plunger holding bottom-surface part 123, and on an upper end of the plunger holding wall 122, that is, on the open side of the plunger holding hole 121, an outer-peripheral blocking plug 126 formed annularly outward in the radial direction of the plunger holding wall 122 is provided.

An outer diameter of the plunger holding bottom-surface part 123 is connected to the plunger holding wall 122 via a valve fixing portion 124 formed smaller than the outer diameter of the plunger holding wall 122, and in the vicinity of a center of the plunger holding bottom-surface part 123, a through hole 125 penetrating the plunger holding bottom-surface part 123 is formed.

The plunger 130 has a plunger main body 131 having an outer diameter slightly smaller than an inner diameter of the plunger holding hole 121 and a hole-shaped urged hole 132 formed in one end of the plunger main body 131.

The check valve unit 141 is mounted on the valve fixing portion 124 of the sleeve 120, and a check ball 142 is urged by a spring 143 so as to block communication between the inside and the outside of the sleeve 120 via the through hole 125.

Subsequently, assembling of the chain tensioner 100 according to the Embodiment of the present invention will be explained by using FIGS. 1 to 3.

First, the sleeve 120 is inserted into the body hole 111 of the tensioner body 110.

At this time, by fitting the valve fixing portion 124 in the positioning portion 115, the communication groove 116 functions as an oil communication path 146 which causes the pressure oil chamber 144 and the oil storing chamber 145 to communicate with each other, which will be described later.

The outer-peripheral blocking plug 126 of the sleeve 120 forms the oil storing chamber 145 between the plunger holding wall 122 and the oil storing wall 112 by blocking the open side of body hole 111.

Subsequently, the urging member 140 is inserted from above the check valve unit 141 mounted in the sleeve 120, and the plunger 130 is inserted into the plunger holding hole 121 of the sleeve 120 so that one end of the urging member 140 is inserted into the urged hole 132.

Since the outer diameter of the plunger main body 131 is formed slightly smaller than the inner diameter of the plunger holding hole 121, a space in which the urging member 140 is interposed is the pressure oil chamber 144, which is a space substantially sealed by the plunger 130 and the sleeve 120.

It is to be noted that, when the chain tensioner 100 is mounted on an engine (not shown), the plunger 130 is urged by the urging member 140 toward the open side of the plunger holding hole 121 all the time, whereby a tension of a timing chain (not shown) is held properly, and vibration is suppressed by pressing a swing chain guide (not shown) and thus, even if the plunger 130 is continuously urged by the urging member 140, the plunger 130 is not removed from the plunger holding hole 121.

As described above, by forming the oil storing chamber 145 around the plunger holding hole 121, the oil storing chamber 145 with a large capacity can be ensured without changing the shape of the entire tensioner body 110 and thus, the size of the tensioner body 110 is not increased, and the chain tensioner 100 does not put a pressure on the space in the engine.

Subsequently, oil supply at the engine start of the chain tensioner 100 according to the Embodiment of the present invention will be explained.

It is to be noted that, for the sake of explanation, it is assumed that the chain tensioner 100 is fixed to the engine (not shown) in a state where the opening part of the plunger holding hole 121 is directed upward.

First, the oil is supplied from the oil supply hole 113 into the oil storing chamber 145.

At this time, the chain tensioner 100 is fixed to the engine (not shown) in the state where the opening part of the plunger holding hole 121 is directed upward, and the oil supply hole 113 is formed in the vicinity of the open side of the plunger holding hole 121 in the oil storing wall 112 and thus, at a height where a liquid level of the oil supplied into the oil storing chamber 145 reaches the oil supply hole 113, the oil in a sufficient amount to fill the pressure oil chamber 144 can be stored in the oil storing chamber 145, and a large amount of the oil stored in the oil storing chamber 145 at the engine stop can be prevented from leaking out of the oil supply hole 113.

The oil supplied into the oil storing chamber 145 passes through the oil communication path 146 and reaches the check valve unit 141.

The check ball 142 is urged by the spring 143, but when the check ball 142 is pushed upward by a pressure of the oil supplied from the oil supply hole 113 or a negative pressure generated in the pressure oil chamber 144 when the plunger 130 advances to the open side of the plunger holding hole, the block between the pressure oil chamber 144 and the through hole 125 (oil communication path 146) is released, and the oil can be supplied into the pressure oil chamber 144.

When the oil is supplied into the pressure oil chamber 144, the air in the pressure oil chamber 144 passes through the slight gap between the plunger 130 and the plunger holding hole 121 and is quickly discharged to the outside of the chain tensioner 100, and the space in the pressure oil chamber 144 is filled with the oil.

As a result, even if the plunger 130 receives a force pressed from the timing chain (not shown) via the swing chain guide (not shown), the plunger 130 can damp it with a proper damping characteristic by the oil in the pressure oil chamber 144 in addition to a repulsive force of the urging member 140, and the vibration and the noise can be suppressed.

It is to be noted that, when the plunger 130 is pressed from the swing chain guide (not shown) side, the check valve unit 141 is blocked and thus, when the plunger 130 performs the damping, even if the capacity in the pressure oil chamber 144 is decreased, the oil does not move to the oil communication path 146 side but slightly leaks out from the gap between the plunger holding hole 121 and the plunger 130.

Moreover, when the pressing of the plunger 130 is released, the plunger 130 slightly moves in a direction of removing from the plunger holding hole 121 and thus, the check valve unit 141 is opened, and the oil is replenished into the pressure oil chamber 144 from the oil storing chamber 145 via the oil communication path 146.

While the engine (not shown) is operating, the damping of the plunger 130 is repeated, and the oil supply from the oil supply hole 113 is also continued and thus, the slight leak-out of the oil from the gap between the plunger holding hole 121 and the plunger 130 and the oil supply from the oil storing chamber 145 into the pressure oil chamber 144 are continued.

When the engine (not shown) is stopped, the oil supply from the oil supply hole 113 is stopped, and the plunger 130 is settled at a predetermined position where the pressing force from the swing chain guide (not shown) as well as the repulsive force by the urging member 140 and the oil in the pressure oil chamber 144 are balanced.

At this time, the oil in the space above the position of the oil supply hole 113 in the oil storing chamber 145 is gradually discharged to the outside of the chain tensioner 100 from the oil supply hole 113, but the oil supply hole 113 is formed in the vicinity of the open side of the plunger holding hole 121 in the oil storing wall 112, and the chain tensioner 100 is fixed to the engine (not shown) with the plunger holding hole 121 directed upward and thus, most of the oil in the oil storing chamber 145 can be kept in the oil storing chamber 145.

Moreover, when a long time has elapsed since the engine (not shown) is stopped, depending on the direction of the chain tensioner 100 or the pressing force from the swing chain guide (not shown) side continuously applied to the plunger 130, the oil in the pressure oil chamber 144 gradually leaks out, and the air can enter again in some cases, and the oil cannot be supplied on time immediately after the subsequent engine start, the plunger 130 cannot obtain the proper damping characteristic, and there is a concern that rattling noise or the like is generated for some time.

However, in the chain tensioner 100 according to the Embodiment of the present invention, the oil storing chamber 145 with a sufficiently large capacity is formed around the plunger holding hole 121, and the oil supply hole 113 is formed in the vicinity of the open side of the plunger holding hole 121 in the oil storing wall 112 and thus, by storing sufficient oil in the oil storing chamber 145 in advance, even without the oil supply from the oil supply hole, the oil in the oil storing chamber 145 can be quickly and reliably supplied into the pressure oil chamber 144 immediately after the engine start, the damping characteristic of the plunger 130 is quickly made proper, and generation of a noise or the like can be suppressed.

Furthermore, since there is no such a time that the sufficient damping effect cannot be obtained at the engine start, a ratchet which limits instantaneous large movement of the plunger 130 does not have to be provided any more, the number of components can be reduced, and even if the urging member 140 with a low load is used, such vibration of the plunger 130 that a noise is generated at the engine start does not occur.

Moreover, since the plunger holding wall 122 is constituted by the sleeve 120, which is a separate body from the plunger body 110, when the oil storing chamber 145 is formed having a cylindrical shape disposed around the plunger holding hole 121 at a center, it is only necessary to cut the body hole 111 with a concentric cylindrical shape with the plunger holding hole 121 and to insert the sleeve 120, and highly accurate machining is not required for the tensioner body 110 and the sleeve 120, whereby the cost-up can be suppressed.

Moreover, the plunger 130 with various outer diameters or the specification change of the capacity of the oil storing chamber 145 or the like can be easily dealt with only by changing the inner/outer diameter of the sleeve 120 without changing the shape of the tensioner body 110.

It is to be noted that a material of the sleeve 120 is not particularly limited, but since the plunger holding wall 122, the through hole 125 (plunger holding bottom-surface part 123), and the outer-peripheral blocking plug 126 are all formed by a combination of cylindrical shapes having the same center axis, in the case where they are made of a resin such as plastic, they can be easily mass-produced by using a molding die, and even in the case of being made of metal, they can be manufactured easily only by cutting a concentric circle, whereby the cost-up can be suppressed.

Moreover, in the sleeve 120, since the plunger holding wall 122 and the plunger holding bottom-surface part 123 are integrally formed, most of the plunger holding hole 121 is constituted by the sleeve 120, there is no spot requiring highly accurate alignment between the tensioner body 110 and the plunger 130 but can be dealt with more easily by the specification change according to the shape of the plunger 130.

Figure 4:
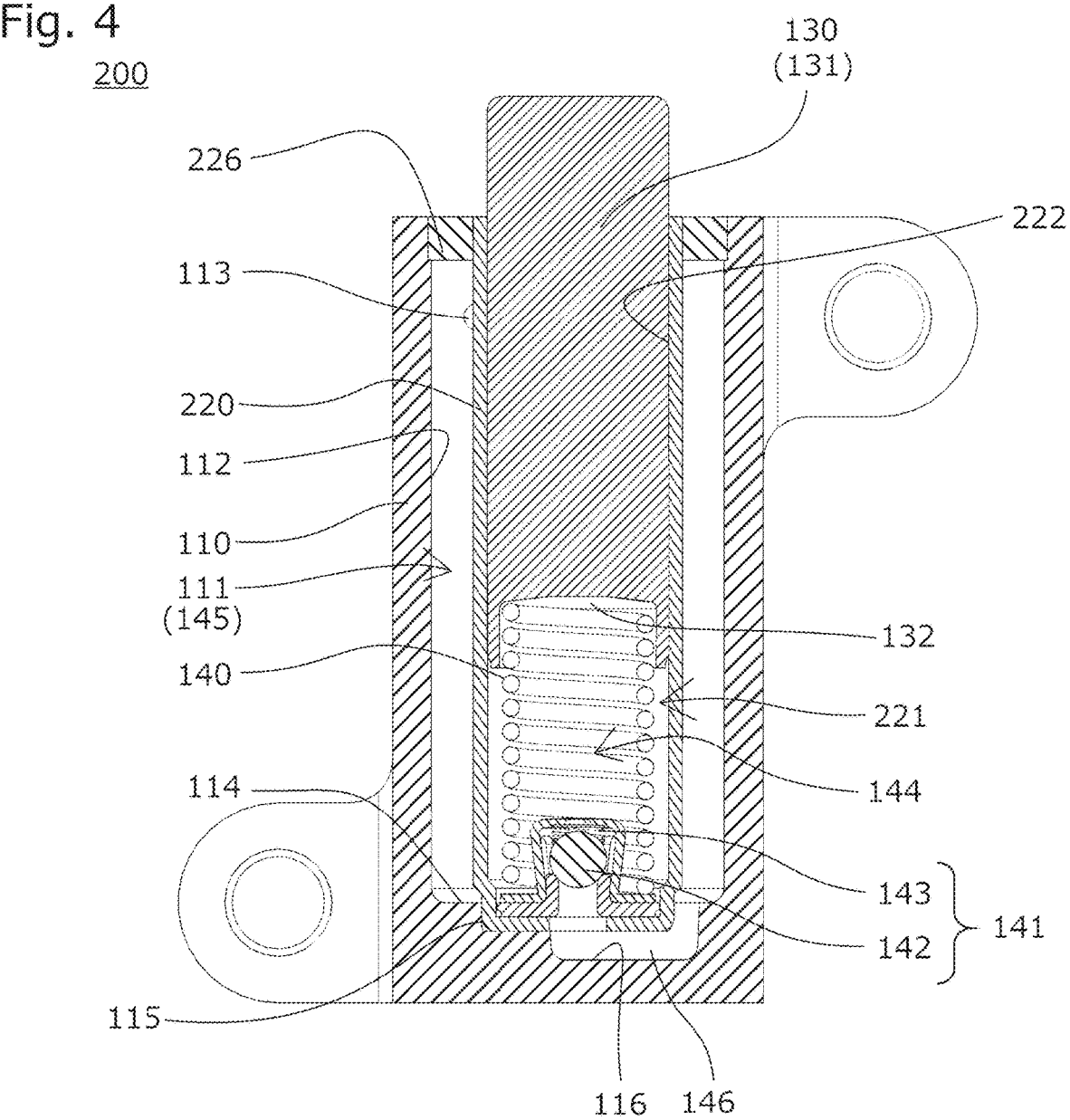
FIG. 4 is a sectional view of a chain tensioner 200 according to the Embodiment of the present invention.

Moreover, as shown in FIG. 4, an outer-peripheral blocking plug 226 may be formed having a ring shape, which is a separate body from a sleeve 220, whereby machining of the sleeve 220 is further facilitated.

Further, by constituting the outer-peripheral blocking plug 226 by a separate material having elasticity such as an O-ring, for example, a plunger holding wall 222 and the oil storing wall 112 can be brought into close contact with the outer-peripheral blocking plug 226 more firmly, and the leak-out of the oil in the oil storing chamber 145 from the body hole 111 can be further prevented.

As described above, the Embodiment of the present invention has been described in detail, but the present invention is not limited to the aforementioned Embodiment but is capable of various design changes without departing from the present invention described in the scope of claims.

It is to be noted that, in the aforementioned Embodiment, the explanation was given by assuming that the sleeve has the storing wall and the storing bottom-surface part, but the constitution of the sleeve is not limited thereto, but, for example, only a cylindrical storing wall may be formed as a sleeve, and a bottom surface part of a body hole may be a storing bottom-surface part or a spiral projection with the same outermost diameter as the inner diameter of the oil storing wall may be provided on an outer peripheral surface of the storing wall.

Moreover, in the aforementioned Embodiment, the explanation was given by assuming that the body hole is formed so that an inner diameter of the opening part of the body hole becomes the largest diameter, but the constitution of the body hole is not limited thereto, but, for example, it may be so constituted that the inner diameter of the opening part of the body hole is smaller than the inner diameter of the oil storing wall and is the same as the outer diameter of the storing wall, or that the inner diameter of the opening part of the body hole is formed smaller than the inner diameter of the oil storing wall, a locking projection protruding inward in the radial direction is provided at the opening part of the body hole, and the outer-peripheral blocking plug overcomes the locking projection and is brought into close contact with the oil storing wall.

Moreover, in the aforementioned Embodiment, the explanation was given by assuming that a storing wall part is formed having a cylindrical shape, but the constitution of the storing wall part is not limited thereto, but, for example, a recessed groove-shaped oil leak groove extending from the open side of the plunger holding hole toward the storing bottom-surface part may be formed in the storing wall part.

Moreover, in the aforementioned Embodiment, the explanation was given by assuming that the chain tensioner is mounted on the engine so that the opening part of the plunger holding hole is directed upward, but a mounting direction of the chain tensioner is not limited thereto, but, for example, disposition may be such that the opening part of the plunger holding hole is directed to a side, and the oil supply hole is formed at a spot located above a center shaft of the body hole in the oil storing wall, and the chain tensioner is mounted such that the oil communication path is directed so as to communicate with a lower side of the center axis of the body hole in the oil storing chamber.

What is claimed is:

1. A chain tensioner comprising:
    a tensioner body having a cylindrical plunger holding hole, one side of which is open,
    a cylindrical plunger slidably inserted into the plunger holding hole, and
    urging means that is telescopically accommodated in a pressure oil chamber formed by the plunger holding hole and the plunger and urges the plunger to a protruding direction on a front side, wherein
    the plunger holding hole has a plunger holding wall directly sliding with the inserted plunger and a plunger holding bottom-surface part at a position opposed to an open side of the plunger holding hole;
    a cylindrical oil storing chamber is provided on an outer periphery side of the plunger holding wall;
    on an end part on the plunger holding bottom-surface part side of the plunger holding hole, a check valve unit that connects the pressure oil chamber and the oil storing chamber capable of being opened/closed is provided;
    the plunger holding wall is constituted by a sleeve that is a separate body from the tensioner body;
    the sleeve has an outer-peripheral blocking plug that blocks the open side of the plunger holding hole in the oil storing chamber; and
    an area between an outer periphery of the plunger and the plunger holding wall is uniformly formed up to an opening end of the plunger holding hole.

2. The chain tensioner according to claim 1, wherein the sleeve is integrally formed with the plunger holding bottom-surface part.

3. The chain tensioner according to claim 1, wherein an oil supply hole that causes an outside of the tensioner body and the oil storing chamber to communicate with each other is provided in the oil storing chamber.

4. The chain tensioner according to claim 3, wherein the oil supply hole is formed in an end part on an opening part side of the plunger holding hole in the oil storing chamber.

5. The chain tensioner according to claim 1, wherein an oil communication path that causes the check valve unit and the oil storing chamber to communicate with each other is formed in the vicinity of the plunger holding bottom-surface part.

6. The chain tensioner according to claim 5, wherein the oil communication path is formed in a groove state in the vicinity of the plunger holding bottom-surface part.

7. The chain tensioner according to claim 1, wherein the area between the outer periphery of the plunger and the plunger holding wall is uniformly formed up to the opening end of the plunger holding hole to have a gap between the outer periphery of the plunger and the plunger holding wall.

* * * * *